(12) United States Patent
Kim et al.

(10) Patent No.: US 9,919,272 B2
(45) Date of Patent: Mar. 20, 2018

(54) MEMBRANES HAVING ANTIBIOTIC AND HYDROPHILIC PROPERTIES AND PREPARATION METHOD THEREOF

(71) Applicant: LG ELECTRONICS INC., Seoul (KR)

(72) Inventors: Sangyoon Kim, Seoul (KR); Junseok Lee, Seoul (KR); Taeyoung Kim, Seoul (KR); Changkeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 322 days.

(21) Appl. No.: 14/722,688

(22) Filed: May 27, 2015

(65) Prior Publication Data

US 2015/0343387 A1    Dec. 3, 2015

(30) Foreign Application Priority Data

May 29, 2014    (KR) .................. 10-2014-0065227

(51) Int. Cl.
*B01D 69/02*    (2006.01)
*B01D 71/02*    (2006.01)
(Continued)

(52) U.S. Cl.
CPC ......... *B01D 69/02* (2013.01); *B01D 67/0002* (2013.01); *B01D 69/148* (2013.01);
(Continued)

(58) Field of Classification Search
CPC ........ B01D 69/02; B01D 71/34; B01D 71/42; B01D 67/0002; B01D 69/148; B01D 71/68; B01D 61/147; B01D 2325/48; B01D 2325/36; B01D 2325/24; B01D 2323/36; C02F 1/444; C02F 1/505; C02F 2303/20; C02F 2303/04; C02F 2305/08
See application file for complete search history.

(56) References Cited

U.S. PATENT DOCUMENTS

2008/0149561 A1*  6/2008  Chu .................. A61L 15/425
                                                210/500.38
2008/0193494 A1*  8/2008  Sabesan ............. A01N 43/16
                                                424/401
(Continued)

FOREIGN PATENT DOCUMENTS

CA    2529236 A1 *  6/2006  ............. A01N 59/16
EP    2160945 A1 *  3/2010  ............. A01N 25/34
(Continued)

OTHER PUBLICATIONS

International Search Report and Written Opinion dated Aug. 27, 2015 issued in Application No. PCT/KR2015/005278.

*Primary Examiner* — Pamela H Weiss
(74) *Attorney, Agent, or Firm* — KED & Associates, LLP (57) ABSTRACT

The present invention relates to a separation membrane having both antibiotic and hydrophilic properties for water treatment and a preparation method thereof. In the separation membrane of the present invention, since an organic compound (antimicrobial and/or hydrophilic compound) is chemically conjugated to non-metal inorganic nanoparticles or metal nanoparticles, the nanoparticles are not eluted from the separation membrane even when the separation membrane is used for water treatment for a long period of time, so that the separation membrane may continuously maintain antimicrobial properties and high water permeability, is safe to the human body even when used for the treatment of drinking water, such as water purification, and exhibits characteristics in which stain resistance is also significantly enhanced due to antimicrobial and hydrophilic properties, which have been continuously imparted. Furthermore, high mechanical strength is exhibited by a metal or inorganic nanofiller introduced.

8 Claims, 4 Drawing Sheets

(51) Int. Cl.
　　　*B01D 71/42*　　(2006.01)
　　　*B01D 67/00*　　(2006.01)
　　　*B01D 69/14*　　(2006.01)
　　　*B01D 71/68*　　(2006.01)
　　　*C02F 1/44*　　(2006.01)
　　　*B01D 71/34*　　(2006.01)
　　　B01D 61/14　　(2006.01)
　　　C02F 1/50　　(2006.01)

(52) U.S. Cl.
　　　CPC ............. *B01D 71/34* (2013.01); *B01D 71/42*
　　　(2013.01); *B01D 71/68* (2013.01); *C02F 1/444*
　　　(2013.01); *B01D 61/147* (2013.01); *B01D
　　　2323/36* (2013.01); *B01D 2325/24* (2013.01);
　　　*B01D 2325/36* (2013.01); *B01D 2325/48*
　　　(2013.01); *C02F 1/505* (2013.01); *C02F
　　　2303/04* (2013.01); *C02F 2303/20* (2013.01);
　　　*C02F 2305/08* (2013.01)

(56)　　　　References Cited

U.S. PATENT DOCUMENTS

2010/0035047 A1* 2/2010 Ajayan .................. C08J 3/20
　　　　　　　　　　　　　　　　　　　　　428/328
2010/0176044 A1* 7/2010 Domb .................. B01J 20/0229
　　　　　　　　　　　　　　　　　　　　　210/205
2010/0230344 A1 9/2010 Srinivas et al.
2010/0323573 A1* 12/2010 Chu ....................... B01D 65/08
　　　　　　　　　　　　　　　　　　　　　442/153
2013/0216600 A1* 8/2013 Da Silva Ferreira et al. ..........
　　　　　　　　　　　　　　　　　　　　　A01N 25/26
　　　　　　　　　　　　　　　　　　　　　424/411
2013/0264287 A1* 10/2013 Zhang ..................... C02F 1/40
　　　　　　　　　　　　　　　　　　　　　210/639
2014/0091031 A1 4/2014 Mansouri et al.
2014/0114055 A1 4/2014 Lee et al.

FOREIGN PATENT DOCUMENTS

| | | | |
|---|---|---|---|
| EP | 2160946 A1 * | 3/2010 | ............ A01N 25/34 |
| KR | 10-1995-0004917 A | 5/1995 | |
| KR | 10-0536643 B1 | 12/2005 | |
| KR | 10-0543573 B1 | 1/2006 | |
| KR | 10-2008-0061049 A | 7/2008 | |
| KR | 10-1139145 B1 | 4/2012 | |
| KR | 10-2012-0076914 A | 7/2012 | |
| KR | 10-1312217 B1 | 9/2013 | |
| WO | WO 2012109239 A1 * | 8/2012 | ......... B29C 47/0004 |
| WO | WO 2012166701 A2 * | 12/2012 | ................ C02F 1/44 |
| WO | WO 2012176190 A1 * | 12/2012 | ................ C02F 1/56 |
| WO | WO 2013/143345 A1 | 10/2013 | |

* cited by examiner

S. aureus - Standard sample

S. aureus - (PES/P(SA-VP)-g-ZnO

E. coli - Standard sample

E. coli - (PES/P(SA-VP)-g-ZnO

MEMBRANES HAVING ANTIBIOTIC AND HYDROPHILIC PROPERTIES AND PREPARATION METHOD THEREOF

CROSS-REFERENCE TO RELATED APPLICATION

This application claims the benefit of earlier filing date and right of priority to Korean Application No. 10-2014-0065227, filed on May 29, 2014, the contents of which is incorporated by reference herein in its entirety.

BACKGROUND OF INVENTION

1. Field of Invention

The present invention relates to a separation membrane having antibiotic and hydrophilic properties for water treatment and a preparation method thereof.

2. Background of Invention

The existing hollow fiber preparation method includes the steps of preparing a film-forming solution by dissolving a polymer material in a solvent, and preparing a porous separation membrane by precipitating the same in a nonsolvent to induce the phase transition. In order for a hollow fiber membrane to be usefully used for water treatment, and the like, characteristics such as antimicrobial properties, high rejection rate and water permeability, stain resistance, and mechanical strength which may withstand the working pressure, are required. In general, for the preparation of a hollow fiber membrane including an ultra filtration membrane, polysulfone, polyethersulfone (PES), polyacrylonitrile or polyvinylidene fluoride (PVDF) and the like are usually used. An ultra filtration membrane prepared by using these materials satisfies the rejection rate as the ultra filtration membrane, but has problems in water permeability and stain resistance characteristics due to low hydrophilicity of the polymer material. Further, since a filtration membrane for water treatment is continuously brought into contact with water, and thus has a problem in that bacteria are growing in the filtration membrane prepared by using a polymer material, a process of periodically subjecting the filtration membrane to a chemical treatment during the use thereof needs to be performed. In order to prevent or suppress bacteria from growing in the filtration membrane, it is required to impart antimicrobial properties to the filtration membrane. In order to increase the water permeability of the ultra filtration membrane, the ultra filtration membrane is prepared by adding a water-soluble polymer polyvinylpyrrolidone (PVP), polyvinyl alcohol (PVA), and the like to a casting solution. However, the thus prepared ultra filtration membrane has problems in that a water-soluble polymer added during the water treatment is dissolved in water, is removed from the ultra filtration membrane, and thus gradually loses hydrophilicity, and as a result, water permeability, rejection rate, and mechanical strength are gradually reduced as the use time elapses.

In order to solve the aforementioned problems of the existing filtration membrane, (1) a method for imparting hydrophilicity by introducing silver nanoparticles into a casting solution (the official gazette of Korean Patent No. 10-1139145), (2) a method for imparting hydrophilicity by subjecting an ultra filtration membrane prepared to plasma treatment (the official gazette of Korean Patent Application Laid-Open No. 10-2008-0061049), (3) a method for imparting hydrophilicity by introducing carbon nanotubes into a casting solution (the official gazette of Korean Patent Application Laid-Open No. 2012-0076914), and (4) a method for preparing an ultra filtration membrane by using a polyacrylonitrile polymer (the official gazette of Korean Patent Publication No. 10-1995-004917), and the like have been developed. From these methods, mechanical strength and hydrophilicity of the ultra filtration membrane have been somewhat improved by introducing a filler, but there is a disadvantage in that it is difficult to expect antimicrobial properties and a continuous improvement in hydrophilicity from the ultra filtration membrane. In addition, hydrophilicity has been improved, and stain resistance and chemical resistance have been somewhat improved by a method for coating an ultra filtration membrane with titania (the official gazette of Korean Patent No. 10-0543573) or a method for preparing an ultra filtration membrane by adding titania to a casting solution (Korean Patent No. 10-0536643), and the like, but it is difficult to expect antimicrobial properties and high water permeability and solute rejection rate.

Throughout the present specification, a number of papers and patent documents are referenced, and citations thereof are indicated. The invention of each of the cited documents is incorporated herein by reference in its entirety to describe the level of the technical field to which the present invention pertains and the content of the present invention more apparently.

SUMMARY OF INVENTION

An object of the present invention is to provide a new separation membrane for water treatment, which simultaneously has superb antimicrobial and hydrophilic properties compared to the existing separation membrane.

Another object of the present invention is to provide a method for preparing the separation membrane.

The other objects and advantages of the present invention will be more apparent from the following detailed description, claims and drawings of the invention.

The present invention provides: a separation membrane for water treatment, which simultaneously has excellent antimicrobial and hydrophilic properties, including: (a) non-metal inorganic nanoparticles grafted with an antimicrobial compound; or (b) metal nanoparticles grafted with an antimicrobial compound or a hydrophilic compound.

(a) Non-Metal Inorganic Nanoparticles Grafted with Antimicrobial Compound

In the present invention, when the nanoparticles added to a separation membrane are non-metal inorganic nanoparticles, the nanoparticles are not antimicrobial in themselves, so that in order to allow the nanoparticles to simultaneously have excellent antimicrobial and hydrophilic properties, an antimicrobial compound needs to be grafted on the surface thereof.

The present inventors have surprisingly found that even though the surface of the nanoparticle was grafted with an antimicrobial compound, antimicrobial and hydrophilic properties of a separation membrane have been simultaneously improved when the nanoparticle were added thereto, and this is because in the case where the surface of the nanoparticle is treated with an organic compound, it is possible to prevent nanoparticles from aggregating, and as a result, the solute rejection rate may be prevented from being decreased, and the nanoparticles included in the separation membrane have higher hydrophilicity than polymer components of the separation membrane, such as polysulfone, and thus, as a whole, the separation membrane simultaneously has hydrophilicity.

In an exemplary embodiment of the present invention, the non-metal inorganic nanoparticles are selected from the group consisting of silica nanoparticles, carbon nanoparticles, a glass fiber filler, a ceramic filler, sepiolite, and xonotolite.

(b) Metal Nanoparticles Grafted with Antimicrobial Compound or Hydrophilic Compound Meanwhile, when the nanoparticles are metal nanoparticles, the nano metal powder itself has antimicrobial properties, and thus, the nanoparticles need not be subjected to surface treatment with an antimicrobial compound, and only if nanoparticles surface-treated with an organic compound are used, antimicrobial and hydrophilic properties may be simultaneously secured.

Metal nanoparticles affect the reproductive function of microorganisms due to the electrical capability of metal ions, and thus are known to exhibit broad antimicrobial and sterilization actions. Starting from the year of 1869, numerous researchers have conducted studies on the ability of microorganisms to inactivate the metal nano powder up to now, and from the studies, a powerful and broad antimicrobial activity of metal nanoparticles and the mechanisms thereof are known. Various explanations for understanding the antimicrobial and sterilization action mechanisms of the metal nanoparticles have been suggested, and as the most widely known explanation, there have been suggested a mechanism of inactivating microorganisms by reacting —SH groups of cysteine which is one of amino acids, which constitutes a protein such as an enzyme with the metal ion, a mechanism of inducing the production of reactive oxygen species (ROS), a mechanism of inactivating microorganisms by allowing metal ions to release the K+ ions present in the cytoplasmic membrane of microorganisms, a mechanism of interrupting the cell division of microorganisms by being directly reacted with bases present in the DNA of microorganisms, and the like.

When the metal nanoparticles exerting the powerful antimicrobial and sterilization actions as described above are eluted from the separation membrane and introduced into drinking water, there is a problem in that serious damage may be caused even to the human body. Accordingly, it is not preferred to introduce metal nanoparticles themselves into a casting solution, and there is a need for developing a technology for preventing the metal nanoparticles from being eluted from the separation membrane.

The present inventors have surprisingly found that when the surface of the metal nanoparticle is treated by grafting the metal nanoparticles with an organic compound, it is possible to prevent the metal nanoparticles from being eluted, and simultaneously, both excellent sterilization and hydrophilic properties may be secured.

As the organic compound for surface treatment of the metal nanoparticles, an antimicrobial compound or a hydrophilic compound may be used.

In an exemplary embodiment of the present invention, as the metal nanoparticles, it is possible to use metal nanoparticles selected from the group consisting of zinc oxide, magnesium oxide, alumina (aluminum oxide), titanium oxide, iron oxide, cerium oxide, silver nanoparticles, gold nanoparticles, and copper nanoparticles.

As the antimicrobial compound used for surface treatment of the nanoparticles of (a) and (b), it is possible to use one or more selected from the group consisting of a sulfonamide compound, a polysulfone-based polymer, a capsaicin compound, and a chitosan compound, and as the hydrophilic compound, it is possible to use one or more selected from the group consisting of hydroxyethyl methacrylate (HEMA), polyvinylpyrrolidone (PVP), polyvinyl alcohol (PVA), a vinylpyrrolidone-acrylonitrile copolymer (P(VP-AN)), a vinylpyrrolidone-vinyl alcohol copolymer (P(VP-VA)), polyetherimide (PEI), polyimide (PI), polyamide (PA), and cellulose acetate (CA).

Here, the sulfonamide compound is a compound having a sulfonamide functional group widely known to suppress bacteria and the like from growing, and includes sulfadiazine (SD), aminobenzene sulfonamide (ABSA), sulfacetamide, sulfadimidine, sulfafurazole, sulfisomidine, sulfadoxine, sulfamethoxazole, sulfamoxole, sulfadimethoxine, sulfamethoxypyridazine, sulfametoxydiazine, sulfadoxine and sulfametopyrazine, and the like, but the examples thereof are not limited thereto.

The sulfonamide compound may be preferably sulfadiazine (SD) or aminobenzene sulfonamide (ABSA), and the polysulfonamide-based polymer may be preferably poly sulfadiazine acrylamide (PSA) or a sufadiazine acrylamide-vinylpyrrolidone copolymer (P(SA-VP)).

In an exemplary embodiment, the separation membrane of the present invention, which includes the nanoparticles of (a) and (b), is an ultra filtration membrane.

The separation membrane of the present invention may include (a) or (b) in an amount of 0.001 to 20 wt % based on the total amount of separation membrane polymer components, and may also include (a) and (b) simultaneously in the above-described content.

The separation membrane of the present invention has high mechanical strength along with excellent antimicrobial and hydrophilic properties, and these characteristics are an effect which is imparted to the separation membrane by a non-metal inorganic nanofiller or metal nanoparticles introduced.

Another aspect of the present invention is to provide a method for preparing a separation membrane for water treatment, which simultaneously includes excellent antimicrobial and hydrophilic properties, the method including: (i) preparing (a) non-metal inorganic nanoparticles grafted with an antimicrobial compound or (b) metal nanoparticles grafted with an antimicrobial compound or a hydrophilic compound; (ii) preparing a separation membrane casting solution by adding the prepared nanoparticles to a polysufone (PS)-based, polyethersulfone (PES)-based, polyacrylonitrile-based, cellulose acetate-based, or polyvinylidene fluoride (PVDF)-based polymer solution; and (iii) forming a separation membrane by using the casting solution.

In the method of the present invention, the antimicrobial compound is one or more selected from the group consisting of a sulfonamide compound, a polysulfonamide-based polymer, a capsaicin compound, and a chitosan compound, and the hydrophilic compound may be one or more selected from the group consisting of hydroxyethyl methacrylate (HEMA), polyvinylpyrrolidone (PVP), polyvinyl alcohol (PVA), a vinylpyrrolidone-acrylonitrile copolymer (P(VP-AN)), a vinylpyrrolidone-vinyl alcohol copolymer (P(VP-VA)), polyetherimide (PEI), polyimide (PI), polyamide (PA), and cellulose acetate (CA).

According to an exemplary embodiment of the present invention, when the nanoparticles in step (ii) are mixed with polymer components, a casting solution may also be prepared by mixing a second polymer and a third polymer or other additives with the nanoparticles for the purpose of achieving more enhanced hydrophilization and imparting porousness and strength, and the like.

According to another exemplary embodiment of the present invention, in forming the separation membrane in step (iii), the separation membrane may also be formed in the form of a thin membrane or a hollow fiber membrane, and the separation membrane may also be prepared by a phase transition method of performing precipitation in a non-solvent, or extrusion and spinning in a non-solvent.

The separation membrane for water treatment prepared according to the method of the present invention as described above exhibits antimicrobial properties as well as high water permeability, excellent mechanical strength, and characteristics in which initial properties are almost maintained even after being used for a long period of time, as compared to the existing separation membrane including an ultra filtration membrane.

In the separation membrane of the present invention, since an organic compound (antimicrobial and/or hydrophilic compound) is chemically bonded to non-metal inorganic nanoparticles or metal nanoparticles, the nanoparticles are not eluted from the separation membrane even when the separation membrane is used for a long period of time for water treatment, so that the separation membrane may continuously maintain antimicrobial properties and high water permeability, is safe to the human body even when used for the treatment of drinking water, such as water purification, and exhibits characteristics in which stain resistance is also significantly enhanced due to antimicrobial and hydrophilic properties, which have been continuously imparted. Furthermore, high mechanical strength is exhibited by a metal or inorganic nanofiller introduced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, the present invention will be described in more detail through the Examples. These Examples are provided only for more specifically describing the present invention, and it will be obvious to a person with ordinary skill in the art to which the present invention pertains that the scope of the present invention is not limited by these Examples.

EXAMPLES

<Preparation of Surface-Treated Non-Metal Inorganic Particles or Metal Nanoparticles>

Example 1

Preparation of Silica Nanoparticles Grafted with Sulfadiazine (SD-g-Silica)

Silica nanoparticles grafted with an antimicrobial organic compound sulfadiazine (SD) were prepared through a reaction including the following four steps.

(1) Silica nanoparticles (1 g) having a size of 40 nm were dispersed in an aqueous NaOH solution (100 ml) having a concentration of 1 mole, and the resulting mixture was reacted for 1 hour to form a hydroxyl group on the surface of the particles.

(2) In order to form an amine group on the surface of the silica nanoparticles to which the hydroxyl groups collected through centrifugation and drying were chemically bonded, silica nanoparticles were dispersed in water (100 ml), and then 3-aminopropyltriethoxysilane (1 g) was put thereinto, and the resulting mixture was reacted at 70° C. for 24 hours to prepare silica nanoparticles grafted with 3-aminopropyltriethoxysilane.

(3) In order to induce a reaction between an amine group present as an end group of the particle and thionyl chloride, particles were dispersed in dimethyl formamide (50 ml), and thionyl chloride (10 g) was put thereinto to perform the reaction at 70° C. for 24 hours. The silica particles were collected through centrifugation, washed five times with 100 ml of water, and dried in a vacuum oven at 60° C. for 24 hours.

(4) After sulfadiazine (1 g) was put into dimethyl formamide (50 ml) and was dissolved, the silica particles prepared were dispersed and reacted at 60° C. for 24 hours to prepare silica nanoparticles grafted with sulfadiazine (SD-g-silica).

Example 2

Preparation of Silica Nanoparticles Grafted with Poly Sulfadiazine Acrylamide (PSA-g-Silica)

(1) Silica nanoparticles (5 g) having a size of 40 nm were dispersed in an aqueous NaOH solution (100 ml) having a concentration of 1 mole, and the resulting mixture was reacted for 1 hour to form a hydroxyl group on the surface of the particles.

(2) In order to form a vinyl group on the surface of the silica nanoparticles, γ-methacryloxypropyltrimethoxysilane (γ-MPS, 1 g) was added to methanol (200 ml), water (180 ml), and a catalyst NH4OH (0.5 mol), and then silica particles having a size of 40 nm (10 g) to which a hydroxyl group was bonded were added thereto, and the resulting mixture was put into an oil bath controlled to a temperature of 30° C. and reacted for 2 hours to prepare silica nanoparticles grafted with γ-MPS.

(3) In order to prepare silica nanoparticles grafted with an antimicrobial organic compound poly sulfadiazine acrylamide (PSA-g-silica), 1 g of silica nanoparticles grafted with γ-MPS were added to a solution including methanol (100 ml), a radical reaction initiator AIBN (0.05 g), and a monomer sulfadiazine acrylamide (SA, 1 g), and a reaction was performed under reflux conditions at 70° C. for 4 hours to prepare PSA-g-silica.

Example 3

Preparation of Silica Nanoparticles Grafted with Aminobenzene Sulfonamide (ABSA-g-Silica)

N-acetylsulfanilyl chloride (1.5 g) was put into ethanol (100 ml) and dissolved through stirring, and then 1 g of silica nanoparticles grafted with 3-aminopropyltriethoxysilane, which had been prepared in Example 1, were added thereto to disperse the mixture. 3 ml of pyridine was put thereinto, and then the mixture was reacted at 60° C. for 24 hours to prepare silica nanoparticles grafted with acetylsulfonamide. The thus prepared silica nanoparticles grafted with acetylsulfonamide were treated with a 10% hydrochloric acid aqueous solution to reduce the methyl amide of the end group into an amine group, thereby preparing silica nanoparticles grafted with aminobenzene sulfonamide (ABSA-g-silica).

Example 4

Preparation of Silica Nanoparticles Grafted with Copolymer of Sulfadiazine Acrylamide and Vinylpyrrolidone Sulfonamide (P(SA-VP)-g-Silica)

P(SA-VP)-g-silica was prepared by keeping the other reaction conditions constant as in Example 2, adding 1 g of silica nanoparticles grafted with γ-MPS to a solution including 0.5 g of sulfadiazine acrylamide and 1 ml of vinylpyrrolidone instead of a solution including a monomer sulfadiazine acrylamide, and performing the reaction under reflux conditions at 70° C. for 4 hours.

Example 5

Preparation of Zinc Oxide Nanoparticles Grafted with Sulfadiazine (SD-g-ZnO)

Zinc oxide nanoparticles grafted with sulfadiazine were prepared by using zinc oxide nanoparticles having a size of 40 nm instead of silica nanoparticles to keep the other reaction conditions constant as in Example 1.

Example 6

Preparation of Zinc Oxide Nanoparticles Grafted with Poly Sulfadiazine Acrylamide (PSA-g-ZnO)

Zinc oxide nanoparticles grafted with poly sulfadiazine acrylamide were prepared by using zinc oxide nanoparticles having a size of 40 nm instead of silica nanoparticles to keep the other reaction conditions constant as in Example 2.

Example 7

Preparation of Zinc Oxide Nanoparticles Grafted with Aminobenzene Sulfonamide (ABSA-g-ZnO)

Zinc oxide nanoparticles grafted with aminobenzene sulfonamide were prepared by using zinc oxide nanoparticles having a size of 40 nm instead of silica nanoparticles to keep the other reaction conditions constant as in Example 3.

Example 8

Preparation of Zinc Oxide Nanoparticles Grafted with Polyvinylpyrrolidone (PVP-g-ZnO)

(1) Zinc oxide nanoparticles (5 g) having a size of 40 nm were dispersed in an aqueous NaOH solution (100 ml) having a concentration of 1 mole, and the resulting mixture was reacted for 1 hour to form a hydroxyl group on the surface of the particles.

(2) In order to prepare zinc oxide nanoparticles grafted with γ-MPS, 10 g of zinc oxide nanoparticles to which the hydroxyl groups collected through centrifugation and drying were chemically bonded were dispersed in water (200 ml), and then a catalyst NH4OH (0.5 mol) and γ-methacryloxypropyltrimethoxysilane (γ-MPS, 1 g) were added thereto, and then, the resulting mixture was put into an oil bath which was controlled to a temperature of 30° C. and reacted for 2 hours to prepare zinc oxide nanoparticles grafted with γ-MPS.

(3) In order to prepare zinc oxide nanoparticles grafted with polyvinylpyrrolidone (PVP-g-ZnO), PVP-g-ZnO was prepared by adding the zinc oxide nanoparticles grafted with γ-MPS to a solution including ethanol (100 ml), a radical reaction initiator AIBN (0.05 g), and a monomer vinylpyrrolidone (VP, 10 ml), and performing a reaction under reflux conditions at 70° C. for 1 hour.

Example 9

Preparation of Zinc Oxide Nanoparticles Grafted with Copolymer of Sulfadiazine Acrylamide and Vinylpyrrolidone (P(SA-VP)-g-ZnO)

Zinc oxide nanoparticles grafted with a copolymer of sulfadiazine acrylamide and vinylpyrrolidone were prepared by keeping the other reaction conditions constant as in Example 8, and using a mixed monomer of sulfadiazine acrylamide (SA, 1 g) and vinylpyrrolidone (5 ml) instead of a monomer vinylpyrrolidone.

<Preparation of Separation Membrane for Water Treatment>

Example 10

Preparation of Ultra Filtration Membranes Each Including Nanoparticles Prepared in Examples 1 to 9

Polyethersulfone (PES, 20 g) was dissolved in a solvent NMP (80 g), and then particles prepared in Examples 1 to 9 were each added in an amount of 5 wt % based on the amount of polyethersulfone to prepare a casting solution. A thin membrane was formed to have a thickness or 100 mm from the casting solution on a polyester non-woven fabric by using a casting knife, and then precipitated in a non-solvent water overnight to prepare an ultra filtration membrane.

Figure 1:
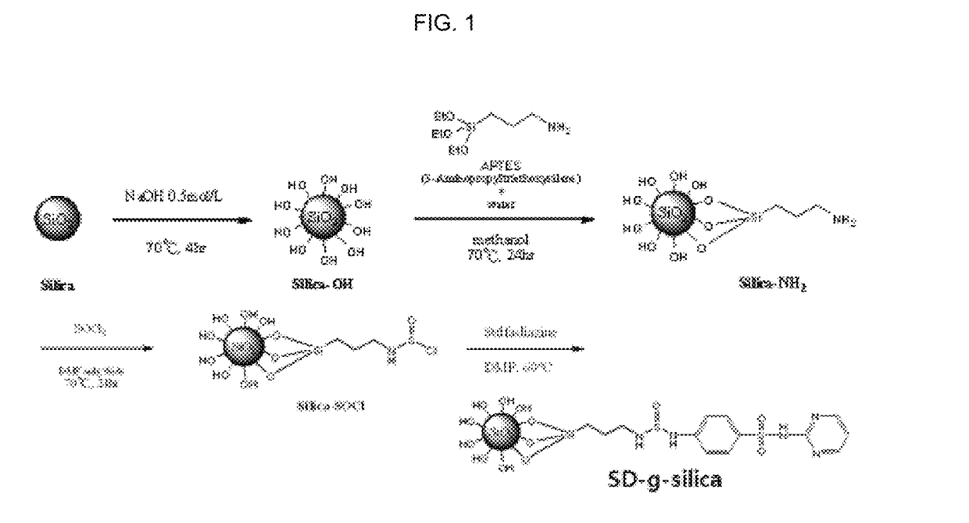
FIG. 1 illustrates a process of preparing SD-g-silica nanoparticles of Example 1.
Figure 2A:
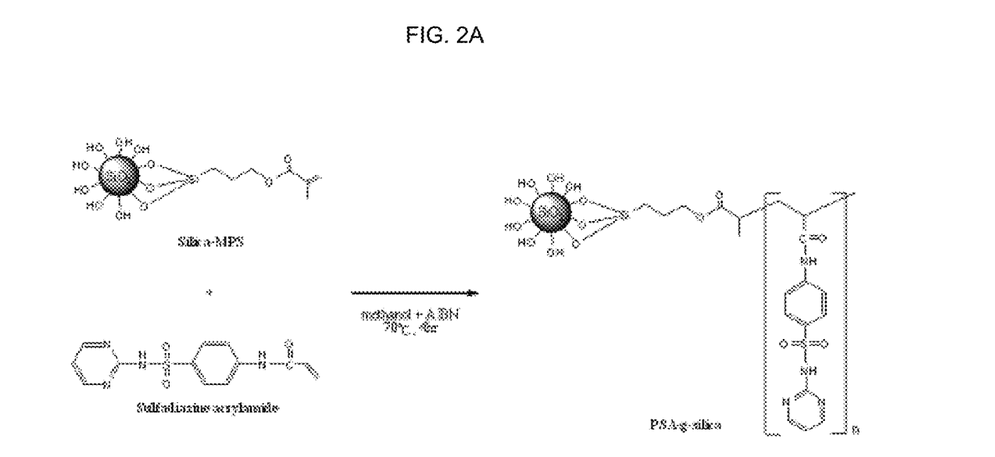
FIG. 2A illustrates a process of preparing a PSA-g-silica and FIG. 2B illustrates an FT-IR spectrum of the PSA-g-silica, of Example 2.
Figure 2B:
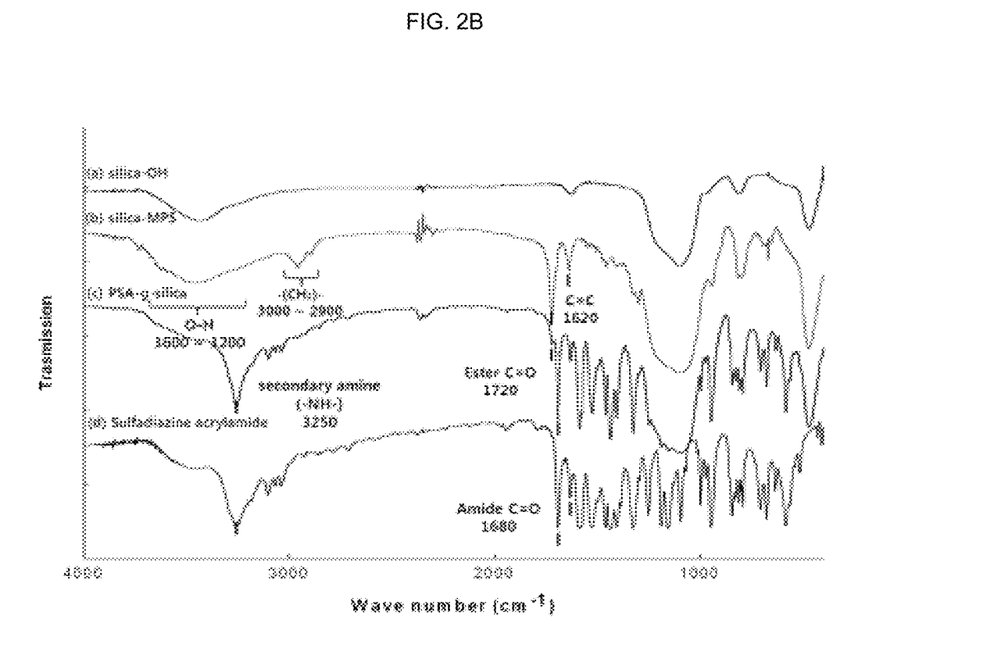
Figure 3:
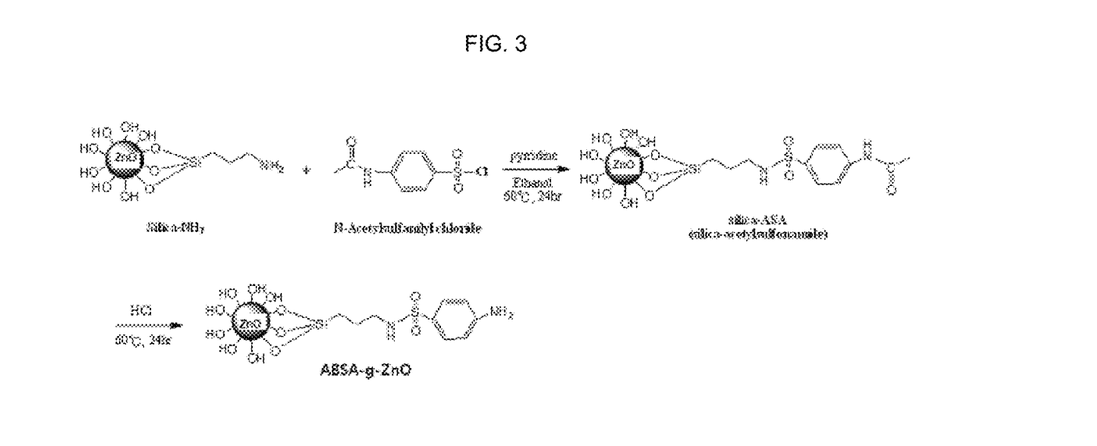
FIG. 3 illustrates a process of preparing the ABSA-g-ZnO of Example 7.
Figure 4:
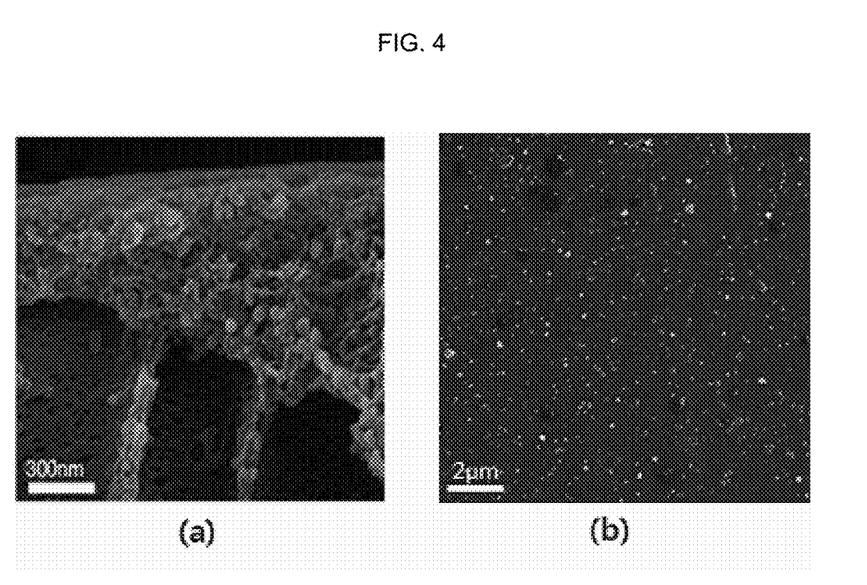
FIG. 4 illustrates (a) a scanning electron microscope photograph of the cross-sectional area of, and (b) a scanning electron microscope photograph of the surface of a polyethersulfone ultra filtration membrane including ABSA-g-ZnO nanoparticles in an amount of 5 wt %.

Among the thus prepared ultra filtration membranes, the cross-sectional area and surface structures of a polyether ultra filtration membrane including ABSA-g-ZnO nanoparticles of Example 7 were observed by a scanning electron microscope, and the results are shown in FIG. 4 (FIG. 4a: Cross-sectional area, FIG. 4b: Surface).

Comparative Example

Preparation of Polyethersulfone (PES) Ultra Filtration Membrane and Ultra Filtration Membrane Including Silica or Zinc Oxide Nanoparticles Before Surface Treatment A casting solution in which polyethersulfone (20 g) was dissolved in a solvent NMP (80 g) was prepared, and a thin membrane was formed to have a thickness of 100 mm from the casting solution on a polyester non-woven fabric by using a casting knife, and then precipitated in a non-solvent water overnight to prepare an ultra filtration membrane including no particles.

Further, polyethersulfone (20 g) was dissolved in a solvent NMP (80 g), and then silica nanoparticles or zinc oxide before a surface treatment were added in an amount of 5 wt % based on the amount of polyethersulfone to prepare a casting solution, and a thin membrane was formed to have a thickness of 100 mm from the casting solution on a polyester non-woven fabric, and then precipitated in a non-solvent water overnight to prepare an ultra filtration membrane including silica nanoparticles or zinc oxide before a surface treatment.

<Performance Test of Separation Membrane for Water Treatment>

Test Example 1

Water Permeability and Solute Rejection Rate of Ultra Filtration Membrane Prepared in Example 10 and Comparative Example Ultra filtration membranes were prepared by using an apparatus of measuring an ultra filtration membrane for an aqueous solution including a polyethylene glycol (PEG) having an average molecular weight of 30,000 g/mol at a concentration of 2,000 ppm, the water permeability and PEG rejection rate thereof were experimented, and the results thereof are shown in the following Table 1.

TABLE 1

Water Permeability and Solute Rejection Rate of Ultra Filtration Membrane Prepared

| Ultra filtration membrane | Rejection rate (%) | Water permeability (L/hr m2 bar) |
|---|---|---|
| PES | 98.1 | 1.6 |
| PES/silica (5 wt %) | 57.6 | 1.9 |
| PES/ZnO (5 wt %) | 55.6 | 2.0 |
| PES/SD-g-silica (5 wt %) | 99.1 | 1.8 |
| PES/PSA-g-silica (5 wt %) | 98.5 | 2.0 |
| PES/ABSA-g-silica (5 wt %) | 98.9 | 2.2 |
| PES/P(SA-VP)-g-silica (5 wt %) | 99.1 | 3.8 |
| PES/SD-g-ZnO (5 wt %) | 98.5 | 2.2 |
| PES/PSA-g-ZnO (5 wt %) | 99.1 | 2.0 |
| PES/ABSA-g-ZnO (5 wt %) | 98.7 | 2.3 |
| PES/P(SA-VP)-g-ZnO (5 wt %) | 99.4 | 4.3 |

A polyethersulfone (PES) ultra filtration membrane including no particles exhibited high solute rejection rate, but had low water permeability. An ultra filtration membrane including silica or zinc oxide nanoparticles, which were not surface-treated (PES/silica and PES/ZnO ultra filtration membrane) tended to slightly increase the water permeability, but significantly reduce the solute rejection rate. This phenomenon occurs because silica or zinc oxide nanoparticles, which were not surface-treated, aggregate from each other in the filtration membrane, and act as a defect of the filtration membrane to reduce the solute rejection rate. However, when an ultra filtration membrane was prepared by using silica or zinc oxide nanoparticles which were surface-treated with an organic compound and grafted, the water permeability as well as the solute rejection rate had been improved. When nanoparticles were surface-treated with an organic compound and grafted, it is possible to prevent silica or zinc oxide nanoparticles from aggregating, and thus it is possible to prevent the solute rejection rate from being reduced, and nanoparticles included in the ultra filtration membrane had higher hydrophilicity than polyethersulfone, thereby improving the water permeability. In particular, in the case of a PES/P(SA-VP)-g-silica ultra filtration membrane and a PES/P(SA-VP)-g-ZnO ultra filtration membrane, which include surface-treated nanoparticles prepared by copolymerizing a sulfadiazine acrylamide monomer and a vinylpyrrolidone monomer having superb hydrophilicity, the water permeability was improved by about 2.5 times or more than that of the polyethersulfone ultra filtration membrane, and the solute rejection rate was slightly improved.

Test Example 2

Figure 5:
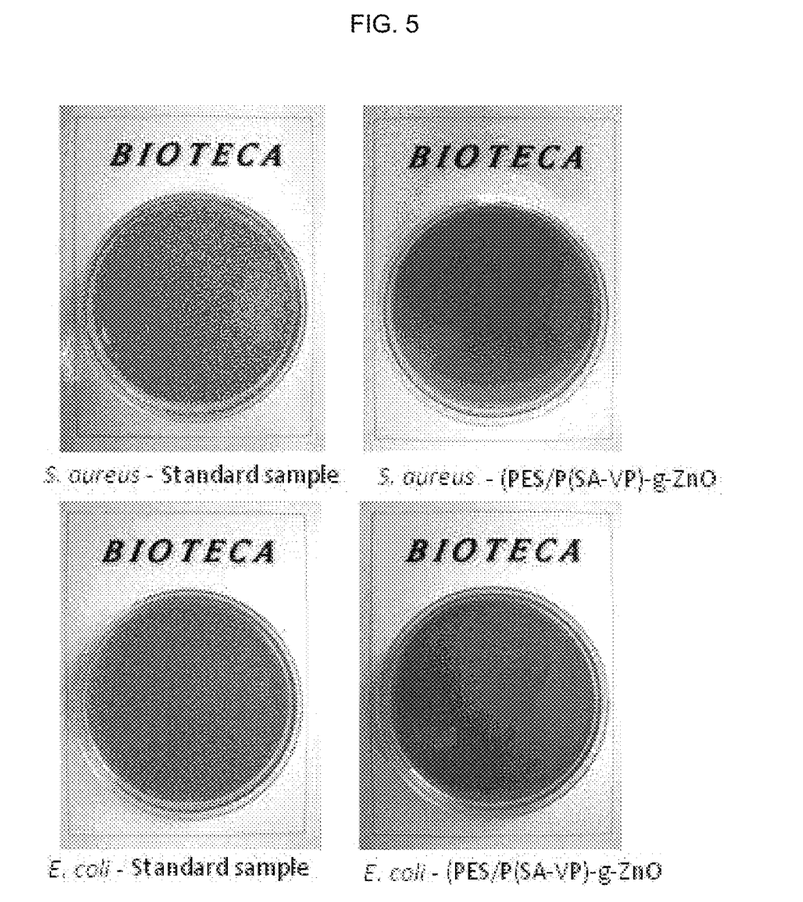
FIG. 5 illustrates the results of a film adhesion method of standard samples and PES/P(SA-g-VP)-g-ZnO ultra filtration membranes.

Antimicrobial Test of Ultra Filtration Membranes Prepared in Example 10 and Comparative Example The antimicrobial properties of the ultra filtration membranes prepared in Example 10 and Comparative Example were experimented by a film adhesion method (JIS Z 2801), and are shown in Table 2. In the film adhesion method, S. aureus (ATCC 6538P) and E. coli (ATCC 8739) were used as the positive bacteria and as the negative bacteria, respectively. The strains of a standard sample (surface area: 25 cm2) were statically incubated at a temperature of 35° C. and a relative humidity of 90% for 24 hours, and then the number of strains was measured to evaluate the antimicrobial properties. The reduction rate of bacteria was calculated from the following equation. A higher reduction rate of bacteria indicates high antimicrobial properties.

$$\text{Reduction rate of bacteria (\%)} = \frac{\left(\begin{array}{c}\text{the number of viable bacteria after 24} \\ \text{hours of incubation of standard sample} - \\ \text{the number of viable bacteria after 24} \\ \text{hours of incubation of antibacterial sample}\end{array}\right)}{\begin{array}{c}\text{the number of viable bacteria after 24} \\ \text{hours of incubation of standard sample}\end{array}} \times 100$$

TABLE 2

Antimicrobial test results of ultra filtration membrane prepared

| Ultra filtration membrane | Reduction rate of S. aureus (%) | Reduction rate of E. coli (%) |
|---|---|---|
| PES | 35.2 | 38.0 |
| PES/silica (5 wt %) | 36.7 | 39.0 |
| PES/ZnO (5 wt %) | 99.9 | 99.9 |
| PES/SD-g-silica (5 wt %) | 78.9 | 77.4 |
| PES/PSA-g-silica (5 wt %) | 88.7 | 90.1 |
| PES/SAD-g-silica (5 wt %) | 95.5 | 93.7 |
| PES/P(SA-VP)-g-silica (5 wt %) | 91.7 | 92.0 |

TABLE 2-continued

Antimicrobial test results of ultra filtration membrane prepared

| Ultra filtration membrane | Reduction rate of S. aureus (%) | Reduction rate of E. coli (%) |
|---|---|---|
| PES/SD-g-ZnO (5 wt %) | 99.9 | 99.9 |
| PES/PSA-g-ZnO (5 wt %) | 99.9 | 99.9 |
| PES/SAD-g-ZnO (5 wt %) | 99.9 | 99.9 |
| PES/P(SA-VP)-g-ZnO (5 wt %) | 99.9 | 99.9 |

The polyethersulfone ultra filtration membrane exhibited a reduction rate of 35.2% and 38% for S. aureus and E. coli, respectively, and the PES/silica ultra filtration membrane, which was not surface-treated, exhibited a reduction rate of 36.7% and 39% for S. aureus and E. coli, respectively. The result indicates that when silica particles are introduced into the ultra filtration membrane without a surface treatment, an improvement in antimicrobial properties may not be expected. However, when silica particles were grafted with an antimicrobial organic compound, that is, SD, PSA, ABSA, or the like and introduced into an ultra filtration membrane, antimicrobial properties were improved. Even a PES/P(SA-VP)-g-silica ultra filtration membrane including nanoparticles surface-treated by copolymerizing an antimicrobial sulfadiazine acrylamide monomer and a vinylpyrrolidone monomer having superb hydrophilicity exhibited high antimicrobial properties compared to a polyethersulfone ultra filtration membrane. In particular, when zinc oxide is introduced into a polyethersulfone ultra filtration membrane, superb antimicrobial properties are exhibited regardless of whether zinc oxide particles are surface-treated. When the result of Test Example 1 and the result of antimicrobial properties are synthesized, the separation membrane prepared from polyethersulfone has high solute rejection rate, but is limited in use due to the problems in that the separation membrane has low water permeability and no antimicrobial properties. In order to impart antimicrobial properties to an ultra filtration membrane by introducing silica nanoparticles having no antimicrobial properties, it is possible to impart antimicrobial properties to the ultra filtration membrane by subjecting silica nanoparticles to surface treatment with an antimicrobial organic compound and introducing the silica nanoparticle into the ultra filtration membrane. When the ultra filtration membrane is prepared by introducing zinc oxide nanoparticles having superb antimicrobial properties, it is possible to impart antimicrobial properties to the ultra filtration membrane regardless of whether the zinc oxide nanoparticles are surface-treated. However, when zinc oxide nanoparticles are not subjected to surface treatment with an organic compound, the solute rejection rate is reduced by aggregation of zinc oxide nanoparticles, so that it is difficult to use the resulting ultra filtration membrane as the ultra filtration membrane. When zinc oxide nanoparticles are subjected to surface treatment with an organic compound and introduced into an ultra filtration membrane, high solute rejection rate and superb antimicrobial properties are exhibited. In particular, a PES/P(SA-VP)-g-silica ultra filtration membrane and a PES/P(SA-VP)-g-ZnO ultra filtration membrane, which include surface-treated nanoparticles prepared by copolymerizing an antimicrobial sulfadiazine acrylamide monomer and a vinylpyrrolidone monomer having superb hydrophilicity improved water permeability by about 2.5 times or more than that of the polyethersulfone ultra filtration membrane, and exhibited high solute rejection rate and superb antimicrobial properties.

Test Example 3

Characteristics of Polyethersulfone Ultra Filtration Membrane into which PSA-g-ZnO or PVP-g-ZnO is Introduced An ultra filtration membrane was prepared by keeping the other preparation conditions of the ultra filtration membrane constant as in Example 10, and using PSA-g-ZnO (2.5% of polyethersulfone) and PVP-g-ZnO (2.5% of polyethersulfone) prepared in Examples 6 and 8 as surface-modified nanoparticles. As a result of experimenting the water permeability, solute rejection rate, and antimicrobial properties thereof, a water permeability of 4.0 L/hr m2 bar, a solute rejection rate of 99.1%, and a reduction rate of bacteria of 99.9% were exhibited.

Test Example 4

Comparison of Tensile Strengths of Ultra Filtration Membranes

The tensile strengths of the ultra filtration membranes prepared in Examples 10 and Comparative Example were measured, and are shown in the following Table 3. An ultra filtration membrane including surface-treated P(SA-VP)-g-silica or PES/P(SA-VP)-g-ZnO nanoparticles exhibited a higher tensile strength than those of a polyethersulfone ultra filtration membrane and an ultra filtration membrane including zinc oxide nanoparticles before a surface treatment.

TABLE 3

Comparison of Tensile Strengths of Ultra Filtration Membranes

| Ultra filration membrane | Tensile strength (MPa) |
|---|---|
| PES/P(SA-VP)-g-ZnO (5 wt %) | 59.8 |
| PES/P(SA-VP)-g-silica (5 wt %) | 58.7 |
| PES/ZnO (5 wt %) | 42.4 |
| PES | 21.2 |

Test Example 5

Change in Performance of Ultra Filtration Membrane Due to Long-Term Use Thereof

A change in performance exhibited when water treatment was used for a long period of time by using a PES/P(SA-VP)-g-ZnO (5 wt %) ultra filtration membrane and a PES ultra filtration membrane was measured, and is shown in Table 4.

TABLE 4

Comparison of Changes in Performance of Ultra Filtration Membranes According to Water Treatment Time

| Elapsed Time From Measurement (week) | PES/P(SA-VP)-g-ZnO (5 wt %) Ultra Filtration Memebrane | | Polyethersulfone Ultra Filtration Memebrane | |
|---|---|---|---|---|
| | Rejection rate (%) | Water permeability (L/hr m2 bar) | Rejection rate (%) | Water permeability (L/hr m2 bar) |
| 1 | 99.4 | 4.3 | 98.1 | 1.6 |
| 2 | 99.5 | 4.1 | 98.4 | 0.9 |
| 3 | 99.0 | 3.9 | 97.3 | 0.5 |
| 4 | 99.2 | 3.7 | 97.1 | 0.2 |

As shown in Table 4, the rejection rates of the two ultra filtration membranes were not changed according to the use time, but the water permeability was slightly decreased for the PES/P(SA-VP)-g-ZnO (5 wt %), but the water permeability was rapidly decreased for the polysulfone ultra filtration membrane according to the use time. The results show that P(SA-VP)-g-ZnO included in the ultra filtration membrane improves antimicrobial and hydrophilic properties of the membrane, thereby significantly improving stain resistance.

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A separation membrane for water treatment having antimicrobial and hydrophilic properties, the separation membrane comprising:
   (a) non-metal inorganic nanoparticles grafted with an antimicrobial compound; or
   (b) metal nanoparticles grafted with the antimicrobial compound or a hydrophilic compound, wherein
   the non-metal inorganic nanoparticles are functionalized with siloxane bonds between the antimicrobial compound and surfaces of the non-metal inorganic nanoparticles,
   the metal nanoparticles are functionalized with siloxane bonds between the antimicrobial compound or the hydrophilic compound and surfaces of the metal nanoparticles,
   the antimicrobial compound is one or more selected from a group consisting of a sulfonamide compound, a polysulfonamide-based polymer, and a capsaicin compound, and
   the hydrophilic compound is one or more selected from a group consisting of hydroxyethyl methacrylate (HEMA), polyvinylpyrrolidone (PVP), polyvinyl alcohol (PVA), a vinylpyrrolidone-acrylonitrile copolymer (P(VP-AN)), a vinylpyrrolidone-vinyl alcohol copolymer (P(VP-VA)), polyetherimide (PEI), polyimide (PI), polyamide (PA), and cellulose acetate (CA).

2. The separation membrane of claim 1, wherein the non-metal inorganic nanoparticles are selected from a group consisting of silica nanoparticles, carbon nanoparticles, a glass fiber filler, a ceramic filler, sepiolite, and xonotolite, and
   the metal nanoparticles are selected from the group consisting of zinc oxide, magnesium oxide, alumina (aluminum oxide), titanium oxide, iron oxide, cerium oxide, silver nanoparticles, gold nanoparticles, and copper nanoparticles.

3. The separation membrane of claim 1, wherein the sulfonamide compound is sulfadiazine (SD) or aminobenzene sulfonamide (ABSA), and
   the polysulfonamide-based polymer is poly sulfadiazine acrylamide (PSA) or a sufadiazine acrylamide-vinylpyrrolidone copolymer (P(SA-VP)).

4. The separation membrane of claim 1, wherein the separation membrane is a polysufone (PS)-based, polyethersulfone (PES)-based, polyacrylonitrile-based, cellulose acetate-based, or polyvinylidene fluoride (PVDF)-based separation membrane.

5. The separation membrane of claim 1, wherein the separation membrane is an ultra filtration membrane.

6. The separation membrane of claim 1, wherein the separation membrane includes (a) or (b) in an amount of 0.001 to 20 wt % based on the total amount of the separation membrane polymer components.

7. The separation membrane of claim 1, wherein the separation membrane includes both (a) and (b).

8. A method of preparing a separation membrane for water treatment having both excellent antimicrobial and hydrophilic properties, the method comprising:
   (i) preparing (a) non-metal inorganic nanoparticles grafted with an antimicrobial compound or (b) metal nanoparticles grafted with an antimicrobial compound or a hydrophilic compound;
   (ii) preparing a separation membrane casting solution by adding the prepared nanoparticles to a polysufone (PS)-based, polyethersulfone (PES)-based, polyacrylonitrile-based, cellulose acetate-based, or polyvinylidene fluoride (PVDF)-based polymer solution; and
   (iii) forming a separation membrane by using the casting solution, wherein
   the non-metal inorganic nanoparticles are functionalized with siloxane bonds between the antimicrobial compound and surfaces of the non-metal inorganic nanoparticles,
   the metal nanoparticles are functionalized with siloxane bonds between the antimicrobial compound or the hydrophilic compound and surfaces of the metal nanoparticles,
   wherein the antimicrobial compound is one or more selected from the group consisting of a sulfonamide compound, a polysulfonamide-based polymer, and a capsaicin compound, and
   the hydrophilic compound is one or more selected from the group consisting of hydroxyethyl methacrylate (HEMA), polyvinylpyrrolidone (PVP), polyvinyl alcohol (PVA), a vinylpyrrolidone-acrylonitrile copolymer (P(VP-AN)), a vinylpyrrolidone-vinyl alcohol copolymer (P(VP-VA)), polyetherimide (PEI), polyimide (PI), polyamide (PA), and cellulose acetate (CA).

* * * * *